Aug. 14, 1934.       G. F. DE WEIN ET AL       1,970,509
BELT
Filed March 11, 1931
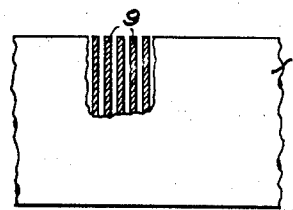
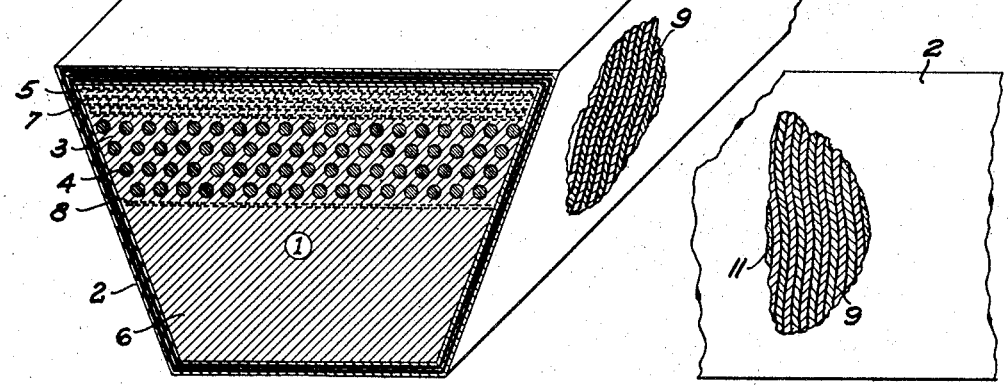
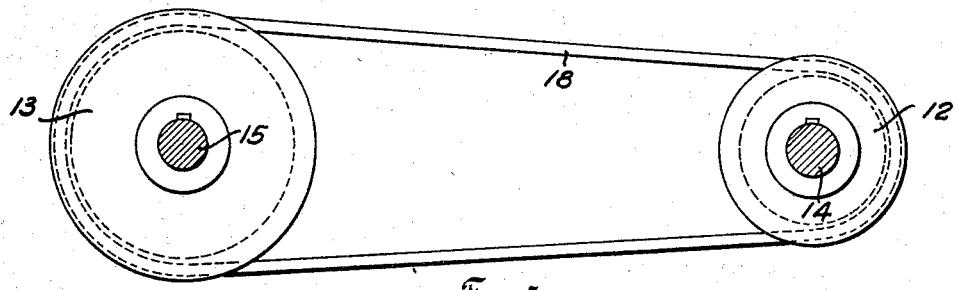
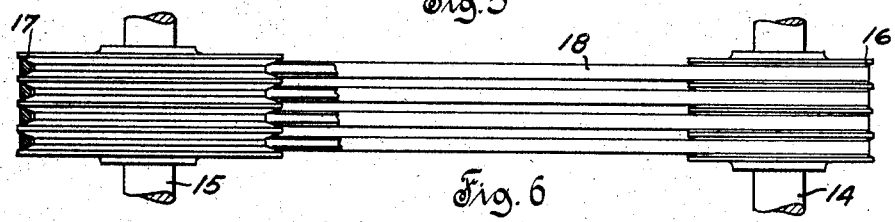
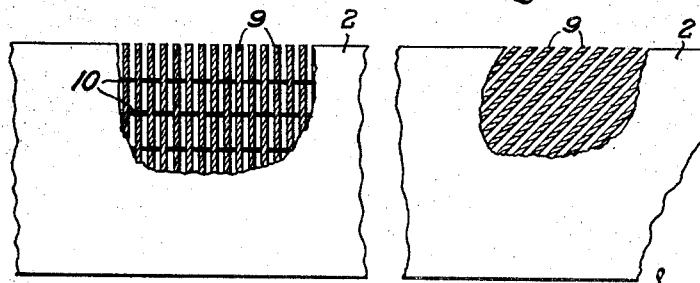

Patented Aug. 14, 1934

1,970,509

UNITED STATES PATENT OFFICE 1,970,509

BELT

George F. De Wein, Milwaukee, Wis., Willard D. Eakin, Hudson, Ohio, and Peter C. McNulty, Milwaukee, Wis., assignors, by direct and mesne assignments, of one-third to The B. F. Goodrich Company, Akron, Ohio, a corporation of New York, and two-thirds to Allis-Chalmers Manufacturing Company, Milwaukee, Wis., a corporation of Delaware Application March 11, 1931, Serial No. 521,636

7 Claims. (Cl. 74—63)

This invention relates to a means of transmission of mechanical energy by what is commonly known as a V-belt drive, comprising an elastic endless V-belt for use with single grooved pulleys and also more particularly a multiple V-belt drive comprising a plurality of elastic V-belts and sheaves having corresponding V-grooves.

This invention comprises a V-belt to be used with such means of transmission. The belt of this invention possesses the very useful advantages of having an increased capacity for transmitting mechanical energy; of having properties which permit it to transmit mechanical energy with a minimum of loss or, in other words, a maximum of efficiency; and also is appreciably more durable and economical in use.

The troubles encountered in close center driving with flat belts transmitting appreciable amounts of power has brought about the development of the continuous or endless, reinforced rubber V-belt. This belt contains no joint and has a uniform tensile strength throughout. The invention disclosed in United States patent to Geist, No. 1,662,511, relates to drives comprising a plurality of elastic endless V-belts for transmitting power. A very wide commercial acceptance and use of this invention, particularly in close center drives, has created a need for a highly effective and efficient belt of this type. The ability of the driving means of that invention to transmit large amounts of power showed the need for an improvement in the structure of the V-belt in order to obtain a belt of even greater efficiency and effectiveness. Prior to this invention this requirement of efficiency and effectiveness in a continuous, elastic, reinforced rubber V-belt has not been completely met. In the patent to Gates, No. 1,400,539, is presented an effort to provide a satisfactory belt. However, the belt disclosed by Gates is designed to provide for the belt a cover of bias fabric to give the belt a limited degree of elasticity beyond the neutral axis.

An elastic V-belt for transmission purposes should be of high tensile strength and at the same time should be capable of being flexed about a sheave of small radius an unlimited number of times without damage to its structure. In order to accomplish this, that portion of the belt contributing most to the tensile strength of the belt may be placed as near to the neutral zone as possible. This zone is that part of the belt where the compression of the inner part of the belt while flexing around a sheave becomes of zero value and changes to tension in the outer part of the belt. That portion of the belt which travels closest to the axes of the sheaves should be of very elastic and compressible material, which will distort and flow without setting up high internal stresses. The outermost layer of the belt must be adapted to some distortion, due to extension, without interposing strong resistance.

The surface of a properly prepared rubber composition can withstand a great deal of rolling contact, even under stress tending to produce slippage, without appreciable wear so long as substantial slippage does not actually occur, but even the best of rubber compositions wears rapidly when there is actual sliding contact under load. Illustrations of this are the fact that automobile tires show remarkable wear-resisting properties so long as they are subjected only to rolling friction but quickly wear out when the wheels become so misaligned that relative movement of the wheel-rim and road cannot be taken care of by deformation of the tire and sliding friction occurs, whereby sliding friction is substituted for internal friction of the tire.

An important fact also is that rubber is highly subject to abrasion when it is in a tensioned condition.

In view of these considerations it is desirable that the belt be so constructed that the necessary deformations will take place with the minimum of tension in its working surfaces and with the minimum of sliding friction between the pulley and the belt, the belt accommodating itself to the pulley for a nonslipping grip by deformation, with only internal friction, rather than by the sliding contact of wedging engagement, and it is desirable that the belt be so constructed as to permit the necessary deformations without the development of high internal forces so that a comparatively small part of the driving force will be absorbed in internal friction in the belt.

In order that the belt may grip the pulley with substantially equal force on its two sides and operate with but little friction other than internal friction, it is desirable that a very pliable wear-resisting coating be so applied as to form a transition coating between the stretch-resisting core of the belt and the pulley surfaces; and for permitting the desired deformation without tendency of the belt to roll laterally or to whip, as in the case of a belt having a single-cable core of cabled cords for high flexibility, it is desirable that the stretch-resisting core cords not only be closely grouped at the neutral zone but that they lie in a layer of approximately uniform thickness so that the thickness of the layer will be as small at all points as possible for a given number of cords, and that the cords be symmetrically arranged with relation to the medial radial plane of the belt, so that the belt will be frictionally held with equal force on its two sides and will not be unsymmetrically deformed by longitudinal tension of the core even though the covering is highly pliable and resiliently deformable. Such a core may be referred to as a "balanced" core and is of especial advantage in combination with the other features of the belt, although the claims are not wholly limited to that type of core.

In the belt of this invention all of these requirements have been met. Here has been evolved a belt which is trapezoidal in section and which contains, as a chief element to provide tensile strength, a layer of textile cords or threads which are embedded in rubber and grouped closely about the neutral zone of the belt. On the inner side of this tensile layer is placed preferably a layer of very elastic vulcanized rubber. On the outer side of the tensile layer are placed, in the preferred embodiment here shown, several alternate layers of vulcanized rubber and woven fabric, the threads of which are preferably in oblique relation to the longitudinal axis of the belt. The structure so far described is the core around which a suitable cover hereinafter described is placed and the whole then vulcanized into trapezoidal form. It will be seen that this type of construction, as represented in Fig. 1, possesses high tensile strength and permits flexing with a minimum of internal stresses.

The cover referred to above comprises cords so placed that all of the cords extend around the belt in the same transverse relation to the longitudinal axis thereof. The cords are embedded in elastic vulcanized rubber and one or more layers of transverse cords may be applied to form the cover about the core of the belt. The cover is so formed that the side driving surfaces of the belt are composed of continuous cord surfaces alternating with continuous rubber surfaces, both extending across the side surfaces of the belt either at oblique angles to the longitudinal axis of the belt or at right angles to the belt.

Belts have been designed and used which possess to a limited extent part of the properties which the belt of this invention possesses. Those belts possess a core with compressible, tensile, and extensible layers, and a cover for the core made of one or more layers of rubberized, woven fabirc, vulcanized in place in such a manner that the warp and weft threads of the woven fabric are placed obliquely to the longitudinal axis of the belt. This cover of vulcanized woven fabric detracts greatly from the pliability of the belt. As we have pointed out above, the cover must be extremely pliable in order to form a transition layer between the stressed core of the belt and the surface of the sheave where abrasion may occur. The pliability of a cover is further important in that it should provide means whereby the lateral thrust produced by the flexing of the belt as it enters the sheave can be distributed evenly over the face of the sheave. Belts having woven fabric covers are unnecessarily limited in life and are incapable of attaining a maximum of traction at the sheave.

The belt of this invention possesses a cover any part of which can be distorted without conveying excessive stresses to adjacent portions of the cover. This construction has the requisite strength and yet permits of the greatest pliability.

A proper proportioning of the thickness and breadth of the compressible layer, the tensile layer, and the extensible layer, lends greatly to the effectiveness and life of the belt. The tensile layer must be thin so that its fibers lie close to the neutral zone of the belt. This portion of the belt performs the chief tension function of transmission. If it were possible to maintain the tensile layer properly alined in the sheaves, and also possible to secure sufficient traction between the edges of the tensile layer and the faces of the sheaves, the compressible and extensible layers of the belt would be unnecessary. However, the other two layers are necessary for the sake of alignment and to transmit to the side walls of the grooves of the sheave the force carried by the cords which lie in a layer parallel to the axis of the sheave. The compressible layer is desirable for causing the belt to grip in the groove by reason of the transverse compression stresses resulting from flexure rather than by wedging action with its attendant sliding friction.

The belt of this invention is so proportioned and designed that a minimum of tension is necessary to create proper traction at the sheaves. Assuming a belt and sheave in which the side surfaces have the same included angle of approximately 40°, as the moving belt enters the sheave the sides of the belt form the same angle as the faces of the sheaves. At a point slightly beyond the point of engagement of the moving belt and the sheave the belt has become flexed and this flexed condition would normally call for an alteration of the angle of the sides of the belt. However, the belt is restrained within the rigid faces of the sheave and there is no alteration in the angle of the sides of the belt. This restrained tendency to distortion results in high lateral stresses against the faces of the sheave and with belts constructed according to this invention these lateral stresses are so uniformly and completely distributed over the face of the sheave that ample traction is obtained without the necessity of a high initial tension to augment the traction by pulling the belt deeper into the groove. When the moving belt is about to leave the sheave the straightening of the flexed belt relieves the lateral stresses against the faces of the sheave and the traction between the belt and the sheave is totally released at the point of tangency. In belts made in accordance with this invention the above mentioned ideal condition is almost completely attained. In other belts which employ a higher initial tension, the disengagement of the belt, due to its wedging into the sheave, requires considerable force and the belt may carry beyond the point of tangency before it strips from the sheave.

These differences between the belts of this invention and those used by others are responsible for marked improvement in durability, in efficiency and in capacity. This improvement in durability and efficiency results from the perfect freedom of engagement and disengagement of the belt and the sheave without friction and the perfect pliability of the cover. Also, it is to be noted that the tractive force in the sheave is established with little if any internal motion in the material of the belt and although high forces are established little energy is involved or lost with belts of this invention. An increase in capacity results from the fact that there is less preloading of this belt due to the lower initial tension, and more of the tensile strength of the belt may be devoted to the transmission of energy.

Belts of this invention are superior to other belts whether used on single or multiple belt transmissions, but are particularly superior on transmissions of the latter type. The great pliability of the cover permits of ready adaptation of each belt in a multiple transmission to its share of the load and the pliability of the coating is actually sufficient to permit it to momentarily ride deeper in its groove without undue wedging. This feature of the belt of this invention may be partly due to the radial arrangement of the slightly sinuous condition of the threads in the side portions of the coating.

In the drawing:

Fig. 1 is an isometric view of a fragment of the belt, with a portion of the cords embedded in the cover exposed at one side and at the top of the belt.

Fig. 2 is a side view of same with a portion of the cords exposed.

Fig. 3 is a fragmentary view of a weftless rubberized sheet of cords used for the cover.

Fig. 4 is a similar view of a weak wefted fabric.

Fig. 5 is a side view of a V-belt drive.

Fig. 6 is a top view of a multiple V-belt drive with the belts broken away over one of the sheaves.

Fig. 7 is a fragmentary view of a weftless rubberized bias cut sheet of cords used for a modified cover.

In Fig. 1, the belt comprises a core 1 and a cover 2 formed to shape by vulcanizing. The core has a zone 3 of tension cords 4 embedded in rubber and located generally at the neutral axis of the belt, but preferably is somewhat nearer the outer periphery than the inner periphery of the belt, as shown, to prevent excessive stretching of the outer periphery or back of the belt as it passes about a small pulley. This zone 3 of tension cords 4 lies between the tension zone 5 shown above and a compression zone 6 shown below of rubber. Zone 5 is usually made of layers of woven fabric 7 with the threads lying obliquely to the length of the belt. Between zone 3 of tension cords 4 and compression zone 6 is usually located one layer of woven fabric 8.

In Fig. 3 is shown one kind of material of which the cover may be made. This cover comprises strong parallel cords 9 impregnated with rubber or held in place by rubber. No cross threads are used in this embodiment.

In Fig. 4 is shown another kind of material of which the cover may be made. This cover is similar to that of Fig. 3 but in addition weak weft threads 10 are used to hold the cords 9 in place during the process of making the cover. These weak threads 10 are intended to break in service, as they have no function after the belt is made.

In forming the belt into shape the cords 9 of the cover 2 may assume a curved or sinusoidal shape 11, Fig. 2, relieving completely any tension to which they may have been subjected while being put on the core 1.

Figs. 5 and 6 show a multiple belt drive comprising a pair of sheaves 12, 13 mounted on shafts 14, 15. The sheaves are formed with alined V-grooves 16, 17 carrying belts 18.

Fig. 7 shows a modified form of cover material. The cords 9 of the cover 2 are caused to extend at oblique angles to the length of the strip by cutting same on a bias. These strips of material for the cover 2 are folded around the core. When the strip of Figs. 3 and 4 are folded around the core, the cords 9 will lie at substantially right angles to the belt axis. When the strip of Fig. 7 is folded around the core, the cords 9 will lie at an oblique angle to the belt axis. The same side surface construction which is obtained by the wrapping of the strip of Fig. 7 can be obtained by helically winding a strip of material around the core, the strip in this case being cut from the sheet of cords with the cords 9 extending parallel to the edges of the strip.

The belts of this invention may be used in single or multiple belt drives. In both cases a given horsepower can be transmitted with less pull on the belt or belts. In a multiple belt drive additionally each belt carries more proportionally its share of the load, resulting in a very much improved driving condition, longer life and greater efficiency.

Tests made on the belts of this invention when applied to a multiple belt drive show; first, that the load is divided among the belts almost in exact proportion to the number of belts used and more perfectly than any other belt; second, that a given load can be transmitted at higher efficiency than with other belts; third, that a given load can be transmitted at a much less total tension between the shafts than with other belts; fourth, this equalization of load between the belts persists throughout a wide variation of the total tension between the shafts, a result not obtained by other belts.

It is believed that the high power-transmission efficiency of the belt is provided by the avoidance of radial and tangential slippage and attendant frictional power loss and also by reason of the fact that the efficient gripping and releasing of the belt is obtained with comparatively little internal distortion of the materials of the belt and consequently with comparatively little loss of power in internal friction.

The high efficiency of the belt indicates that a relatively small part of the power is wasted by being applied to the production of destructive strains or destructive frictional heating of the belt and in practice accordingly it is found that the belt gives long service as well as high efficiency.

The equalization of the driving load on the several belts in a multiple-belt drive, when the belts have such longitudinal stretchability or transverse compressibility as to provide the equalizing effect, is brought about by the fact that the belt initially carrying more than its share of the load passes into the groove of the drive pulley in a more stretched condition and also at a position deeper in the groove and thus closer to the axis of the pulley than it does with respect to the driven pulley, onto which it passes in a relatively relaxed condition, and both of these factors, relative stretch and short radius of revolution about the axis of the drive pulley, result in less mass of the belt being drawn onto the drive pulley at each revolution thereof than passes onto the driven pulley at each peripheral movement thereof corresponding, in non-slippage drive, to the one revolution of the drive pulley. Thus, during such time as the belt referred to is taking more than its share of the load and consequently is undergoing stretch as it leaves the driven pulley and is taking a relatively shortradius position in the drive pulley, there is a corresponding lag in the speed of the driven pulley, which in commercial practice is very small but which can be clearly visualized by assuming an all-rubber belt in a single belt drive and of such stretchability and under such load as to undergo a stretch of 100%, for example, in passing into the drive reach, but of such length as to relax completely in passing into the return reach. In that case, given as an extreme illustration, the driven pulley would take on twice as much mass of the belt, in a given peripheral movement of the driven pulley, as would be taken on by the drive pulley in a like peripheral movement, and the peripheral speed of the driven pulley would be only half that of the drive pulley.

At the same time that in terms of mass and time the over-loaded belt in the multiple-belt drive is feeding more rapidly onto the driven pulley, than it is onto the drive pulley, the lag of the driven pulley's speed being lessened by such power-transmission as is being effected by the less over-loaded belt or belts of the set, any belt taking less than its share of the load is being drawn onto the drive pulley at more nearly the same rate, in terms of mass and time, as it is being drawn onto the driven pulley, and thus its behaviour is consonant with less lag than is actually occurring, more of its mass being fed out of its drive reach in a given length of time than is fed into that reach in the same length of time, with the necessary result that it becomes more taut in its drive reach and takes more nearly its share of the load. Concurrently the over-loaded belt, whose behaviour is consonant with a lag either substantially equal to or greater than that actually occurring, depending upon whether the less loaded belts are initially taking any substantial part of the load, feeds into its drive reach faster than it feeds out of it, in terms of mass and time, and thus becomes relieved of its over-load as the initially under-loaded belts take up their shares of the load.

In order that this phenomena of multiple-belt drives may take place without excessive power loss and belt destruction incident to high internal friction which occurs in extensive stretching or extensive lateral deformation of the belt, it is especially important in such drives that the belt be only of such longitudinal stretchability or lateral compressibility, or both, as to provide in a moderate length of time the equalizing effect described, without being subjected to excessive internal or external friction, and it has been found that the belt herein described possesses the necessary characteristics in high degree and is of especial advantage in multiple-belt drives.

Belts of this character very promptly take up their respective shares of the load in a multiple-belt drive and yet show high efficiency, notwithstanding the fact that the equalizing phenomenon in its very nature involves a temporary power loss. A set of belts of the character described lessen this power loss by equalizing promptly and their equalization then results in continued uniform operation within a range of moderate distortion which, being alike in all, is not excessively high in any one of the belts.

The belt probably provides the necessary yielding for prompt equalization, without excessive internal friction, by reason of the fact that the rubber, which is substantially incompressible in volume, is free to flow locally in directions transverse to the belt, upon lateral compression of the belt in the pulley groove, and thus to relieve excessive strains locally, without any cumulative effect such as occurs in a belt having a woven-fabric cover, in which the strains must be relieved largely by flow of the rubber longitudinally of the belt toward the portion thereof which is not within the pulley groove, which results in a cumulative bulging effect at the belt's point of entrance into the groove and a cumulative longitudinal strain in the rubber of the belt within the pulley groove.

It is known that British Patent No. 26,837 of 1911 to Gray discloses a cover made from "weak weft fabric" and in which the cords extend around the belt transversely to the axis thereof, but the belt disclosed with this cover has a stiff core which offsets or defeats the advantages that are obtained with the present construction.

In other belts previously used as, for example, the belt disclosed in the United States patent to Gates No. 1,400,539, hereinbefore referred to, the cover contains cords running in different directions crossing each other, but the cords are those of a woven fabric and they not only contact and chafe each other in the flexing of the belt but also locally restrain the rubber against flow in directions transverse to the belt and compel the longitudinal flow of the rubber with its cumulative effect above described. The life and efficiency of the cover are affected very largely by the amount of internal heating caused by the flexing of the belt and it is an important element of this invention to produce a cover so designed that the cords do not come in contact with one another and consequently do not rub over one another when the belt is flexed. By having the cords run transversely around the belt a segmental structure is secured in which the cords in the cover can be likened to a series of spaced parallel rings, as to the cover shown in Figs. 1, 2 or 4. This provides a maximum of flexibility by reducing to a minimum the internal heating producing long life of both the cover and the cords therein.

The cover shown in Fig. 7, however, in which the cords extend obliquely about the belt, has the advantage of containing reinforcing cords lying in positions such as to transmit effectively and with minimum distortion of material the forces required to be transmitted obliquely from the inner and outer peripheral regions of drive-pulley contact to the intermediate region of the stretch-resisting core and from that intermediate core region obliquely to the inner and outer peripheral regions of driven-pulley contact.

The contact between the belts of this invention and the grooves of the sheave affords an efficient gripping action. Such gripping action is obtained by so forming the cover that the side driving surfaces of the belt comprise cover cords with rubber in the spaces between the adjacent cords, that is, the side driving surfaces of the belt are composed of continuous cord surfaces alternating with continuous rubber surfaces both extending across the side surfaces of the belt either at oblique angles to the longitudinal axis of the belt or preferably at right angles thereto. In either case the individual cords have an independent action.

The belt preferably is made by winding in succession upon a drum, in superposed relation, extensive sheets of the cushion rubber 6, the woven fabric 8, cord fabric comprising the strength-giving cords 4, and the fabric of the tension zone 5, to form a composite tubular structure, then cutting the tubular structure transversely into a plurality of endless core members, and then applying the cover by feeding a strip of the covering fabric 2 longitudinally onto the core structure and wrapping it laterally about the same and lapping its margins as shown in Fig. 1 for the outer ply preferably the full width of and on the back of the belt.

A two ply cover may be provided by continuing such application of a single covering strip, of sufficient length, throughout two complete turns of the belt, which preferably is straightened temporarily for the reception of the cover without wrinkles, the straightening progressing about the belt as the cover is applied, and allowing the belt to spring back progressively to curved form with the cover strip adhered thereto, which results in the cover assuming the final curved form without buckling on the inner periphery of the belt, the spacing of the transverse cords of the cover being uniformly increased at the outer periphery and uniformly decreased at the inner periphery by the return of the belt structure to curved form.

To permit the cover strip conveniently to be fed longitudinally onto that periphery of the belt which is its inner periphery in service and joined in a seam on the opposite face, which becomes the outer face in service, the belt core may be turned inside out for reception of the cover and then turned back again before the molding and vulcanizing operation.

The core members may be cut from the tubular structure in rectangular cross-sectional form and the belt molded to V-form after reception of the cover, or core sections of the final trapezoidal form may be cut from the tubular structure.

This general procedure has been employed heretofore with cover strips of bias-cut square-woven fabric, but the return of the belt to curved form and the turning of the belt inside-out sets up strains in the crossed cords of the square-woven fabric and results in uneven tensions in the different parts of the cover, whereas in the case of the weftless or weak wefted cord fabric such result does not occur, the cords being free to vary their spacing according to the local conditions, and their spacing permitting a free outward flow of rubber between them to provide adequate rubber insulation between them, thus substituting non-abrasive internal friction of rubber for the sawing friction of the crossed cords of bias fabric.

So far as known it has not heretofore been proposed to vary the spacing of freely separable cover cords by flexure or inversion of the belt structure before vulcanization or to mold from rectangular to trapezoidal cross-sectional form a belt having cover cords which are freely separable and adapted to take their new positions without substantial tension, although the cross-section perimeter of the belt, as a matter of geometry, is greater in its trapezoidal than in its rectangular form, and which are spaced apart so that the rubber can flow out between them with avoidance of the straining and compression against the mold which occurs in the case of the comparatively impervious woven fabric.

The weft threads of the weak-wefted cord fabric preferably are only of sufficient strength and number to hold the warp cords in proper relationship for their manipulation in the rubberizing, strip-forming and cover-applying operations, and some or all of them may be broken in the returning of the belt to curved form, in the turning of the covered belt inside out, in the molding of the belt, or in the flexing and tensioning of the belt in service.

It should be understood that it is not desired to limit the invention to the exact details of construction shown and described, for obvious modifications may occur to persons skilled in the art.

It is claimed and desired to secure by Letters Patent:

1. A belt comprising a core body of rubber, a set of primary tension cords spaced apart in said body, extending directly lengthwise of the belt, disposed symmetrically with relation to the middle radial plane of the belt, having substantially the same condition of stretch-resistance, and spaced throughout, but confined to, a neutral zone of approximately uniform radial thickness, a set of cover cords spaced apart and extending transversely of the belt, and rubber insulating the cover cords from each other and from the tension cords of the core and constituting substantially the only means maintaining the spacing of the cover cords.

2. A belt comprising a core of rubber and a set of primary tension cords extending directly lengthwise of the belt and all closely grouped in the neutral zone of the belt, a set of cover cords extending transversely of the belt, and rubber insulating the cover cords from the cords of the core and constituting substantially the only means maintaining the relationship of the cover cords.

3. A belt comprising tension elements closely grouped in the neutral zone of the belt and constituting substantially the only stretch-resisting elements of the belt, a set of cover cords extending transversely of the belt, and rubber insulating the cover cords from the cords of the core and constituting substantially the only means maintaining the relationship of the cover cords.

4. A belt comprising tension elements closely grouped in the neutral zone of the belt and constituting substantially the only stretch-resisting elements of the belt, a set of cover cords extending directly crosswise of the belt, and rubber insulating the cover cords from the cords of the core and constituting substantially the only means maintaining the relationship of the cover cords.

5. A belt comprising a core of rubber and tension elements embedded therein and closely grouped in a radially thin neutral zone of the belt, a set of cover cords extending transversely of the belt, and rubber insulating the cover cords from each other and from the tension elements of the core.

6. A belt as defined in claim 5 in which the cover cords lie in positions oblique to the length of the belt.

7. A belt as defined in claim 5 in which the neutral zone of the belt is nearer the outer than the inner periphery of the belt by reason of the location of the tension elements at that position.

GEORGE F. DE WEIN.
WILLARD D. EAKIN.
PETER C. McNULTY.